United States Patent
Werner

[15] 3,665,354
[45] May 23, 1972

[54] MAGNETIC CHUCK

[72] Inventor: Maurer Werner, Oberhubstrasse 21, Zollikerberg, Switzerland

[22] Filed: Feb. 1, 1971

[21] Appl. No.: 111,353

[52] U.S. Cl. ............................................. 335/295, 335/304
[51] Int. Cl. ......................................................... H01f 7/04
[58] Field of Search ................... 335/285, 291, 295, 304, 306

[56] References Cited

UNITED STATES PATENTS

| | | | |
|---|---|---|---|
| 2,895,092 | 7/1959 | Cluwen | 335/304 |
| 3,593,239 | 7/1971 | Hofman | 335/306 X |

Primary Examiner—George Harris
Attorney—Flynn & Frishauf

[57] ABSTRACT

A magnetic chuck in which the magnetic holding force is produced by permanent magnets and mechanically movable means are provided for diverting the magnetic flux and thus facilitate removal of the workpiece in the unclamped position. For suppressing an undesirable magnetic shunt from the magnetic chuck through the machine and therefore preventing magnetization of the tools, such as drills or milling cutters, at least one magnet member is disposed on the lower side of the base plate of the magnetic chuck, having an upper pole of identical polarity to the bottom poles of the permanent magnets, and further the base plate is magnetically isolated relative to the head plate of the magnetic chuck.

7 Claims, 3 Drawing Figures

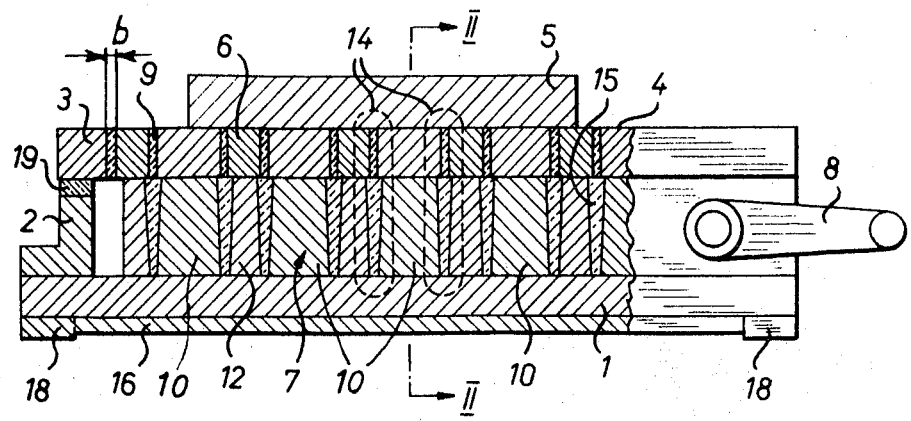
Fig. 1
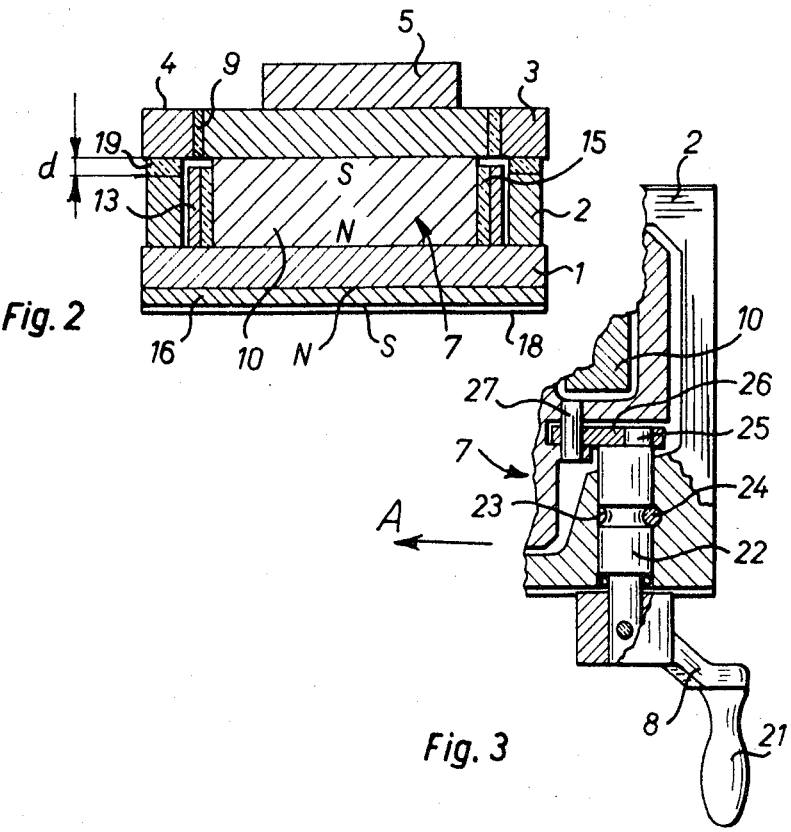
Fig. 2
Fig. 3

MAGNETIC CHUCK

This invention relates to magnetic chucks in which the magnetic holding force is produced by permanent magnets and mechanically movable means are provided for diverting the magnetic flux and thus facilitate removal of the workpiece.

More particularly the invention relates to a magnetic chuck having a head plate and a base plate each of which is made of ferromagnetic material, a ferromagnetic frame within there is disposed a pack of permanent magnets, the frame and permanent magnets being disposed between the head plate and base plate, the head plate having pole shoes therein, mechanically operated means for moving the permanent magnets relatively to the pole shoes between a clamped position in which, in operation, the magnetic flux passes outwardly of the head plate and through a ferromagnetic workpiece disposed on the head plate, and an unclamped position in which the magnetic flux is short-circuited by the pole shoes and does not substantially pass outwardly of the head plate.

When such magnetic chucks are used for the machining of workpieces of steel or the like in drilling machines, metal chips are liable to adhere to the drill or milling cutter due to magnetization of the latter. This may make it difficult to remove all the waste metal produced, and may result in clogging of the tool, while there may be additional wear on the tool together with inaccurate machining because of the chips jammed between the work and the tool. In many cases this prevents magnetic chucks from being used.

The magnetization of tools, such as drills or milling cutters is the consequence of a magnetic shunt from the magnetic chuck through the machine tool. The path of this magnetic shunt is from the bottom magnet pole of the magnetic chuck through the base plate of the latter, the table of the drilling or milling machine, the machine column, the spindle, the machine tool, and finally to the other magnet pole below the head plate of the magnetic chuck. This undesired magnetic flux then effects the magnetization of the drill or milling cutter and thus causes the chips to cling to the machining tool.

It is an object of the invention to suppress the undesirable magnetic shunt through the machine and thus to prevent the magnetization of the tool. It is consequently possible to widen the field of application of such magnetic chucks and to make them usable for precision work.

Subject matter of the present invention: Briefly, the base plate is magnetically isolated from the head plate by an intermediate layer of non-ferromagnetic material or by an air gap, and at least one magnet member disposed on or near the lower side of the base plate, said magnet member having an upper pole or poles of identical polarity to the bottom poles of the permanent magnets for preventing the transmission of auxiliary magnetic flux through a machine tool carrying the magnetic chuck.

The invention will be described by way of example with reference to the accompanying drawing, wherein:

FIG. 1 is a vertical section in the longitudinal direction through a magnetic chuck according to the invention, the parts being shown in the clamped position;

FIG. 2 is a cross section through the magnetic chuck on the line II—II of FIG. 1; and FIG. 3 is a horizontal broken-away section through a portion of the magnetic chuck of FIGS. 1 and 2.

The magnetic chuck or magnetic work holder contains a base plate 1 on which there is seated a closed rectangular frame 2 of steel. The upper end face of the frame 2 is covered all around by a layer 19 of non-magnetic material, for example brass, aluminum, white metal, or plastics material. Above the layer 19 there is disposed a top plate or head plate 3 of ferromagnetic material, such as, for example, unalloyed steel or soft iron, the upper side 4 of said head plate 3 forming the support surface for a workpiece 5 to be machined and thus to be held fast.

Pole shoes 6, extending in the transverse direction are inserted into slots in the head plate 3, each pole shoe 6 or pole piece being formed of a material having high magnetic permeability. Each pole shoe 6 is slightly shorter and narrower than the respective slot in the head plate 3 in which it is located, so that a gap is left all around the pole shoe, which gap is filled with a non-magnetic material 9, for example brass, aluminum, white metal, or plastics material. As a result, the pole shoes 6 are made fast to the head plate 3 or integrally united with the body of the head plate 3 but are magnetically isolated in relation to one another and to the head plate 3. The thickness $d$ of the layer 19 is made greater than the width $b$ of the non-magnetic material 9 between the head plate 3 and each pole shoe 6.

The frame 2 surrounds the permanent magnets 7 and forms a solid block or pack 7. The pack 7, which are thus disposed within the frame 2, may with the aid of a rotatable hand lever 8, 21, be displaced horizontally relative to the stationary frame 2 and thus also relative to the stationary base plate 1 and the stationary head plate 3. The pack 7 comprises individual permanent magnets 10 all of which are disposed in a homopolar arrangement in the pack 7. That is to say, all like poles of the permanent magnets 10 are situated on the same side, i.e. either at the top or at the bottom. In the illustrated embodiment, all the north poles N of the permanent magnets 10 of the pack 7 are disposed at the bottom, that is to say adjacent the base plate 1, and all the south poles S are disposed at the top, i.e. adjacent the head plate 3. The individual permanent magnets 10 are enclosed annularly by a non-magnetic material 15, such as brass, aluminum white metal, or plastics material. These permanent magnets 10 are held rigidly in a grid comprising crossbars 12 and longitudinal bars 13, with the aid of the non-magnetic material 15. The grid is made of magnetically conductive material, for example of silicon-iron, and together with the permanent magnets 10 and the layer of material 15 surrounding them, forms a solid, continuous block, namely the pack 7 containing the permanent magnets. The permanent magnets 10 are magnetically separated or isolated from the grid by the non-magnetic material 15. Between the longitudinal bars 13 of the grid and the head plate 3 there is a gap (see FIG. 2). On the other hand, the magnets 10 should lie as close as possible against the head plate 3 and against the base plate 1, but in such a way that the magnets can still easily be mechanically displaced horizontally in relation to the head and base plates.

According to FIG. 3, a hand lever 8 is joined to an eccentric 25, so that when the hand lever 8 is turned through 180° the entire permanent magnet pack 7 is displaced longitudinally relative to the stationary frame 2 from a clamped position shown in FIG. 1 to an unclamped position (not shown). The displacement of the pack 7 to the unclamped position moves the permanent magnets 10 to positions in which they lie in the region of the pole shoes 6 and are magnetically short-circuited by them. When on the other hand the permanent magnet pack 7 is situated in the clamped position illustrated in FIG. 1, for the purpose of holding a workpiece 5, a magnetic flux is produced as indicated by broken lines 14. This flux being passed through the workpiece 5 and deflected in the latter, so that the workpiece 5 is held fast magnetically on the upper side 4 of the head plate 3. When, however, the permanent magnet pack 10 is moved into the unclamped position by turning the lever 8, this has the effect that the magnetic flux is no longer conducted through the workpiece 5 but passes through the pole shoes 6 inside the head plate 3, that is to say the magnetic flux is shunted out of the workpiece and is not passed through the workpiece 5, so that the latter can easily be lifted off the upper side 4 or displaced on the latter. In the clamped position shown in FIG. 1, in which the workpiece has to be held fast magnetically, the crossbars 12 of the grid and the pole shoes 6 lie exactly one above the other. This produces the magnetic flux which is indicated in FIG. 1 and which is closed on the one hand by the workpiece 5 and on the other hand by the base plate 1 to form a magnetic circuit. In the unclamped position, on the other hand, the magnet pack 7 is displaced in such a manner that the crossbars 12 of the grid and the pole shoes 6 are no longer vertically aligned. Although the magnetic flux still passes through the base plate, and the crossbars 12 of the grid as previously, the magnetic circuit is however no longer closed by the workpiece 5 but passes inside the head plate 3 and its pole shoes 6.

The displacement of the permanent magnet pack 7 between the magnetically clamped and unclamped positions is effected by means of a lever 8 and a hand crank 21 which is mounted on a horizontal shaft 22 rotatably supported in the frame 2. The shaft 22 is secured against axial displacement by a vertical pin 24 which engages in an annular groove 23. On the inner end of the shaft 22 there is provided an eccentric pin 25 which engages rotatably in a connecting link 26 extending in the longitudinal direction of the frame. The other end of said link 26 is connected by a pin 27 to the pack 7 containing the permanent magnets 10. The outermost permanent magnet 10 (shown in FIG. 3) is shorter than the other permanent magnets, so that sufficient place remains for the necessary adjustment. When the hand lever 21 is turned through 180° in FIG. 3, the entire pack 7 is thus displaced in the direction of the arrow A to the unclamped position with the aid of the eccentric pin 25 and the link 26.

In order to prevent the formation of an undesired auxiliary magnetic flux starting from the bottom pole of the permanent magnets 10, by way of the base plate 1, the metallic table of a machine tool, the column or metallic casing of the machine tool, the machine spindle, the machining tool, the workpiece 5, and the head plate 3 to the top pole of the permanent magnet 10, another magnetic plate 16 is situated on or below the base plate 1. This magnetic plate 16 is magnetized in such a manner that the magnetization axis extends perpendicularly, so that one magnetic pole is situated at the top and the other magnetic pole at the bottom. The magnetic axis both of the permanent magnets 10 and of the magnetic plate 16 thus extends in the vertical direction. This magnetic plate 16 is fastened on the base plate 1 in such a manner that like poles of said magnetic plate and of the magnets 10 situated thereabove lie against one another. Since all the magnets 10 of the permanent magnet pack 7 have their like poles on the same side, for example all the north poles N of said magnets 10 lie at the bottom, all the north poles N of the magnetic plate 16 must therefore lie at the top, as shown in FIG. 2. Since in this arrangement the magnetic plate 16 and the base plate 1 magnetically repel one another, the magnet plate 16 is fastened rigidly to the lower side of the base plate 1 by screws, rivets, or adhesive bonding. The field strength required by this magnetic plate 16 depends on the field strength of the permanent magnets 10 and is so selected that the undesired magnetic flux through the machine tool is suppressed. The thickness of the magnetic plate 16 is less than half the thickness of the base plate 1, but is preferably greater than the height of the gap $d$ between the frame 2 and the head plate 3. Instead of a single magnetic plate 16, a plurality of magnetic plate parts spaced apart from one another could be provided, but these would all need to have the same pole directed towards the permanent magnets 10, that is to say they must be similarly magnetized to the magnetic plate 16. On the lower side of the ends of the base plate 1 there are fastened foot strips 18 which are made of non-magnetic material, for example aluminum or brass, and which are at least as thick as the magnetic plate 1 for spacing the magnetic plate 16 from the machine table.

In contrast to magnetic chucks which are known in themselves, and in which the frame 2 surrounding the magnet pack 7 is made entirely of aluminum, in the magnetic chuck according to the invention the frame 2 is made of a ferromagnetic material, for example of steel; only on the upper end face of said frame 2 is there provided a layer of non-magnetic material 19. Magnetic stray fields are collected in this frame 2 and consequently can no longer have a disturbing effect in the environment.

Instead of the intermediate layer made of non-magnetic material 19, it would also be possible to provide a gap, for example an air gap, magnetically isolating the base plate 1 from the head plate 3. Because of the risk of dirt and damage to the parts inside the frame it is however preferred to fill the gap between the top end face and the head plate 3 with a non-magnetic material 19.

In this way it is possible to avoid the magnetization of the metal cutting tools, such as drills or milling cutters, and thus the troublesome adhesion thereto of metal chips.

The polarity of the permanent magnets 10 and of the magnetic plate 16 could naturally also be reversed, that is to say with all the south poles S at the bottom in the case of the magnets 10 and with the south poles S situated at the top in the case of the magnetic plate 16, so that here again two like poles lie opposite one another in order to prevent magnetic shunting through the machine tool.

Various changes and modifications of the magnetic chuck can be made as required by specific design, within the scope of the inventive concept. Accordingly,

What is claimed is:

1. Magnetic chuck comprising a head plate and a base plate each of which is made of ferromagnetic material, a ferromagnetic frame within which there is disposed a pack of permanent magnets, the frame and permanent magnets being disposed between the head plate and base plate, the head plate having pole shoes therein, mechanically operated means for moving the permanent magnets relatively to the pole shoes between a clamped position in which, in operation, the magnetic flux passes outwardly of the head plate and through a ferromagnetic workpiece disposed on the head plate, and an unclamped position in which the magnetic flux is short-circuited by the pole shoes and does not substantially pass outwardly of the head plate, the base plate being magnetically isolated from the head plate, and at least one magnet member disposed adjacent the lower side of the base plate, said magnet member having an upper pole of identical polarity to the bottom poles of the permanent magnets for preventing the transmission of auxiliary magnetic flux through a machine tool carrying the magnetic chuck.

2. Magnetic chuck according to claim 1 in which the thickness of an intermediate layer between the top end face of said frame and the lower side of said head plate is at least equal to the thickness of non-magnetic material surrounding each of said pole shoes in the head plate.

3. Magnetic chuck according to claim 1, in which there is at least one permanent magnet member rigidly connected to the base plate.

4. Magnetic chuck according to claim 1, in which there is a single planar magnetic plate covering substantially the entire surface of the base plate.

5. Magnetic chuck according to claim 1, wherein the thickness of the magnet member is less than half the thickness of the base plate.

6. Magnetic chuck according to claim 1, wherein the base plate is provided with foot means of non-magnetic material the height of which is greater than the thickness of said magnet member.

7. Magnetic chuck, comprising a head plate of magnetic material formed with a plurality of transversely disposed parallel slots therein, an equal plurality of pole shoes of magnetic material, each disposed in one of said slots in said head plate, each of said pole shoes having a thickness equal to that of said head plate and a length and a width less than those of the corresponding slots, thereby forming an annular gap about each pole shoe, non-magnetic material filling the annular gaps between said pole shoes and said head plate, a base plate of magnetic material disposed in spaced parallel relation to said head plate, a frame extending between said head plate and said base plate, said head plate, frame and base plate together constituting an interior chamber, a grid of magnetic material slideably disposed within said chamber, said grid including a plurality of transversely disposed parallel conductor bars of magnetic material in said chamber, and a pair of longitudinal members connecting together the ends of said transversely conductor bars, said conductor bars and longitudinal members together defining a plurality of transverse recesses extending through the thickness of said grid, a plurality of permanent magnets, each disposed in one of said recesses and having their polar faces opposed said inner surface of said head and base plates respectively and being homopolar arranged, each of said magnets having a length and width less than those of the recess in which it is disposed so as to be spaced apart both from the conductor bars and from the longitudinal members of the grid, non-magnetic material being arranged in the annular gaps between said magnets and said grid forming together a solid block, means extending through said frame for causing longitudinal sliding movement of said block within said chamber, further permanent magnet means disposed below said base plate, the polarity of the under pole of said permanent magnets and the polarity of the upper pole of said further permanent magnet means being identical to thereby prevent transmission of a disturbing auxiliary magnetic flux.

* * * * *

UNITED STATES PATENT OFFICE
CERTIFICATE OF CORRECTION

Patent No. 3,665,354             Dated May 23, 1972

Inventor(s) Werner Maurer

It is certified that error appears in the above-identified patent and that said Letters Patent are hereby corrected as shown below:

Page 1, Item 30:

"Foreign Application priority data
February 16, 1970, Switzerland, 2167/70".

Add the following reference of record:

2,609,430, 9/1952 Bower 175/367     335/295

Signed and sealed this 26th day of September 1972.

(SEAL)
Attest:

EDWARD M. FLETCHER, JR.           ROBERT GOTTSCHALK
Attesting Officer                    Commissioner of Patents